US010079787B2

(12) United States Patent
Liu et al.

(10) Patent No.: US 10,079,787 B2
(45) Date of Patent: Sep. 18, 2018

(54) METHOD AND APPARATUS FOR CREATING GROUP AND EXITING GROUP

(71) Applicant: Xiaomi Inc., Beijing (CN)

(72) Inventors: Guoming Liu, Beijing (CN); Xibei Zhang, Beijing (CN); Weiliang Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 548 days.

(21) Appl. No.: 14/521,056

(22) Filed: Oct. 22, 2014

(65) Prior Publication Data

US 2015/0271112 A1 Sep. 24, 2015

Related U.S. Application Data

(63) Continuation of application No. PCT/CN2014/082877, filed on Jul. 24, 2014.

(30) Foreign Application Priority Data

Mar. 20, 2014 (CN) .......................... 2014 1 0105101

(51) Int. Cl.
*H04L 12/18* (2006.01)
*H04L 12/58* (2006.01)
(Continued)

(52) U.S. Cl.
CPC .......... *H04L 51/046* (2013.01); *H04L 12/185* (2013.01); *H04W 4/08* (2013.01); *H04W 4/12* (2013.01)

(58) Field of Classification Search
CPC .............................. H04L 51/046; H04L 12/185
(Continued)

(56) References Cited

U.S. PATENT DOCUMENTS 5,983,270 A * 11/1999 Abraham ................ H04L 29/06
709/224
7,702,726 B1 * 4/2010 Grabelsky ............ H04L 63/102
709/204
(Continued)

FOREIGN PATENT DOCUMENTS

CN 1941718 A 4/2007
CN 1956386 A 5/2007
(Continued)

OTHER PUBLICATIONS

Vipul, "Membership testing problem", Jun. 25, 2013, groupprops.subwiki.org (2 pages).*
(Continued)

*Primary Examiner* — Wing F Chan
*Assistant Examiner* — Leon Y Tseng
(74) *Attorney, Agent, or Firm* — Finnegan, Henderson, Farabow, Garrett & Dunner LLP

(57) ABSTRACT

A method for exiting a group includes receiving an exiting request for exiting a target subgroup. The exiting request is sent by a client and includes a subgroup identifier of the target subgroup. The method further includes searching a member list of the target subgroup according to the subgroup identifier and deleting the client from the member list. The target subgroup is associated with a target group. Members of the target subgroup constitute a subset of members of the target group.

4 Claims, 22 Drawing Sheets

(51) Int. Cl.
*H04W 4/08* (2009.01)
*H04W 4/12* (2009.01)

(58) Field of Classification Search
USPC .......................................................... 709/204
See application file for complete search history.

(56) References Cited

U.S. PATENT DOCUMENTS

| | | |
|---|---|---|
| 2002/0083136 A1 | 6/2002 | Whitten, II |
| 2002/0156879 A1 | 10/2002 | Delany et al. |
| 2004/0148333 A1 | 7/2004 | Manion et al. |
| 2006/0148485 A1* | 7/2006 | Kangas ................ H04W 36/12 |
| | | 455/453 |
| 2006/0235981 A1 | 10/2006 | Westman et al. |
| 2008/0141146 A1 | 6/2008 | Jones et al. |
| 2013/0024789 A1 | 1/2013 | Adkins et al. |
| 2013/0346504 A1 | 12/2013 | Huang et al. |

FOREIGN PATENT DOCUMENTS

| | | |
|---|---|---|
| CN | 101150536 | 3/2008 |
| CN | 101296200 | 10/2008 |
| CN | 101997783 A | 3/2011 |
| CN | 102790923 A | 11/2012 |
| CN | 103297280 | 9/2013 |
| CN | 103888344 | 6/2014 |
| EP | 1 394 713 A1 | 3/2004 |
| JP | 11-196029 A | 7/1999 |
| JP | 2001160858 A | 6/2001 |
| JP | 2004164599 A | 6/2004 |
| JP | 2007329582 A | 12/2007 |
| JP | 2007536841 A | 12/2007 |
| JP | 2009225319 A | 10/2009 |
| JP | 2010021863 A | 1/2010 |
| JP | 2010140245 A | 6/2010 |
| JP | 2010218353 A | 9/2010 |
| KR | 10-2006-0078601 | 7/2006 |
| RU | 2483474 C2 | 5/2013 |
| WO | WO 03/087998 A2 | 10/2003 |
| WO | WO 2012/111255 A1 | 8/2012 |
| WO | WO 2013/056529 A1 | 4/2013 |

OTHER PUBLICATIONS

European Extended Search Report of European Patent Application No. 15158305.1, dated Jul. 28, 2015, issued by the European Patent Office (5 pages).

Korean Search Report of Korean Patent Application No. 10-2014-7026536 dated Jul. 28, 2015, issued by the Korean Patent Office (7 pages).

International Search Report of PCT/CN2014/082877, from the State Intellectual Property Office of China, dated Dec. 31, 2014.

Office Action dated Oct. 28, 2016, in counterpart Russian Application No. 2015130840/06(047494) and English translation thereof.

* cited by examiner

METHOD AND APPARATUS FOR CREATING GROUP AND EXITING GROUP

CROSS REFERENCE TO RELATED APPLICATIONS

This application is a Continuation of International Application No. PCT/CN2014/082877 with an international filing date of Jul. 24, 2014, which is based upon and claims priority to Chinese Patent Application No. 201410105101.5, filed on Mar. 20, 2014, the entire contents of both of which are incorporated herein by reference.

TECHNICAL FIELD

The disclosure relates to instant messaging, and more particularly, to a method for creating a group, a method for exiting from a group and an apparatus.

BACKGROUND

Group function is one of usual and important functions in instant messaging applications. In practical usage, a user in a group may send a message to a server with which the instant messaging application communicates, and the server forwards the received message to other users in the group. As such, all the users in the group can receive the message sent by that user.

However, in some scenarios, a user may only need to communicate with some users in the group. For example, when a host wants to discuss with several managers about whether to kick some member out of the group, the host may only need to communicate with these managers, rather than all the members in the group. In the conventional technology, the user may request to create a new group which includes the members with whom the user needs to communicate.

However, after the user creates the new group, each member in the new group can invite any user in his or her friends list to join the new group. As a result, the new group may include users who are not in the initial group. Since the new group is created for the purpose of discussing some issues in the initial group, the messages in the new group may be meaningless to some users, and it would be a waste of server resource to forward the messages to such users.

SUMMARY

In accordance with the disclosure, there is provided a method for creating a group. The method includes receiving a creating request for creating a target subgroup out of a target group to which a client sending the creating request belongs. The creating request includes a group identifier of the target group. The method also includes creating the target subgroup associated with the target group. Members of the target subgroup constitute a subset of members of the target group. The method further includes sending a subgroup identifier of the target subgroup to the members of the target subgroup.

Also in accordance with the disclosure, there is provided a method for creating a group. The method includes sending a creating request to a server for creating a target subgroup out of a target group to which a client belongs. The creating request includes a group identifier of the target group. The method further includes receiving a subgroup identifier of the target subgroup sent by the server. Members of the target subgroup constitute a subset of members of the target group.

Also in accordance with the disclosure, there is provided a method for exiting a group. The method includes receiving an exiting request for exiting a target subgroup. The exiting request is sent by a client and includes a subgroup identifier of the target subgroup. The method further includes searching a member list of the target subgroup according to the subgroup identifier and deleting the client from the member list. The target subgroup is associated with a target group. Members of the target subgroup constitute a subset of members of the target group.

Also in accordance with the disclosure, there is provided a method for exiting a group. The method includes receiving an exiting request for exiting a target group. The exiting request is sent by a client and includes a group identifier of the target group. The method also includes searching for a subgroup identifier associated with the group identifier. Members of a subgroup to which the subgroup identifier corresponds constitute a subset of members of the target group. The method further includes searching a member list of the target group according to the group identifier, deleting the client from the member list of the target group, searching a member list of the subgroup according to the subgroup identifier, and deleting, by a processor, the client from the member list of the subgroup.

Also in accordance with the disclosure, there is provided an apparatus for creating a group. The apparatus includes a processor and a non-transitory computer-readable storage medium storing instructions. The instructions, when executed by the processor, cause the processor to receive a creating request for creating a target subgroup out of a target group to which a client sending the creating request belongs. The creating request includes a group identifier of the target group. The instructions also cause the processor to create the target subgroup associated with the target group. Members of the target subgroup constitute a subset of members of the target group. The instructions further cause the processor to send a subgroup identifier of the target subgroup to the members of the target subgroup.

Also in accordance with the disclosure, there is provided an apparatus for creating a group. The apparatus includes a processor and a non-transitory computer-readable storage medium storing instructions. The instructions, when executed by the processor, cause the processor to send a creating request to a server for creating a target subgroup out of a target group to which a client installed on the apparatus belongs. The creating request includes a group identifier of the target group. The instructions further cause the processor to receive a subgroup identifier of the target subgroup sent by the server. Members of the target subgroup constitute a subset of members of the target group.

Also in accordance with the disclosure, there is provided an apparatus for creating a group. The apparatus includes a processor and a non-transitory computer-readable storage medium storing instructions. The instructions, when executed by the processor, cause the processor to receive an exiting request for exiting a target subgroup. The exiting request is sent by a client and includes a subgroup identifier of the target subgroup. The instructions further cause the processor to search a member list of the target subgroup according to the subgroup identifier and delete the client from the member list. The target subgroup is associated with a target group. Members of the target subgroup constitute a subset of members of the target group.

Also in accordance with the disclosure, there is provided an apparatus for creating a group. The apparatus includes a processor and a non-transitory computer-readable storage medium storing instructions. The instructions, when executed by the processor, cause the processor to receive an exiting request for exiting a target group. The exiting request is sent by a client and includes a group identifier of the target group. The instructions also cause the processor to search for a subgroup identifier associated with the group identifier. Members of a subgroup to which the subgroup identifier corresponds constitute a subset of members of the target group. The instructions further cause the processor to search a member list of the target group according to the group identifier, delete the client from the member list of the target group, search a member list of the subgroup according to the subgroup identifier, and delete the client from the member list of the subgroup.

Also in accordance with the disclosure, there is provided a non-transitory computer-readable storage medium storing instructions that, when executed by a processor, cause the processor to receive a creating request for creating a target subgroup out of a target group to which a client sending the creating request belongs. The creating request includes a group identifier of the target group. The instructions also cause the processor to create the target subgroup associated with the target group. Members of the target subgroup constitute a subset of members of the target group. The instructions further cause the processor to send a subgroup identifier of the target subgroup to the members of the target subgroup.

Also in accordance with the disclosure, there is provided a non-transitory computer-readable storage medium storing instructions that, when executed by a processor, cause the processor to send a creating request to a server for creating a target subgroup out of a target group to which a client installed on the apparatus belongs. The creating request includes a group identifier of the target group. The instructions further cause the processor to receive a subgroup identifier of the target subgroup sent by the server. Members of the target subgroup constitute a subset of members of the target group.

Also in accordance with the disclosure, there is provided a non-transitory computer-readable storage medium storing instructions that, when executed by a processor, cause the processor to receive an exiting request for exiting a target subgroup. The exiting request is sent by a client and includes a subgroup identifier of the target subgroup. The instructions further cause the processor to search a member list of the target subgroup according to the subgroup identifier and delete the client from the member list. The target subgroup is associated with a target group. Members of the target subgroup constitute a subset of members of the target group.

Also in accordance with the disclosure, there is provided a non-transitory computer-readable storage medium storing instructions that, when executed by a processor, cause the processor to receive an exiting request for exiting a target group. The exiting request is sent by a client and includes a group identifier of the target group. The instructions also cause the processor to search for a subgroup identifier associated with the group identifier. Members of a subgroup to which the subgroup identifier corresponds constitute a subset of members of the target group. The instructions further cause the processor to search a member list of the target group according to the group identifier, delete the client from the member list of the target group, search a member list of the subgroup according to the subgroup identifier, and delete the client from the member list of the subgroup.

DETAILED DESCRIPTION

Embodiments consistent with the disclosure include a method and an apparatus for creating a group and exiting a group.

Hereinafter, embodiments consistent with the disclosure will be described with reference to the drawings. Wherever possible, the same reference numbers will be used throughout the drawings to refer to the same or like parts.

Figure 1:
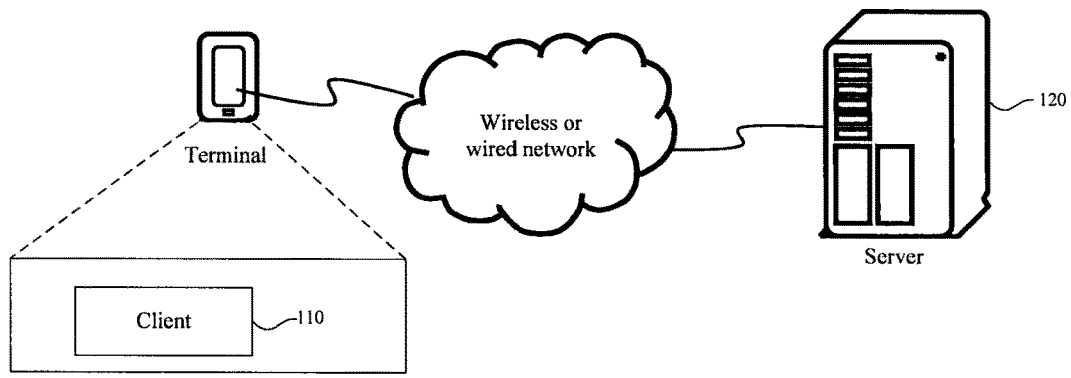
FIG. 1 is a diagram showing an implementation environment according to an exemplary embodiment.

FIG. 1 is a diagram showing an implementation environment for managing a group consistent with embodiments of the disclosure. As shown in FIG. 1, the implementation environment includes a client 110 and a server 120. The client 110 may be provided by an instant messaging service provider and installed on a terminal. The server 120 is a server provided by the instant messaging provider for the client 110. The server 120 can communicate with the client 110 via a wired or wireless network.

Figure 2:
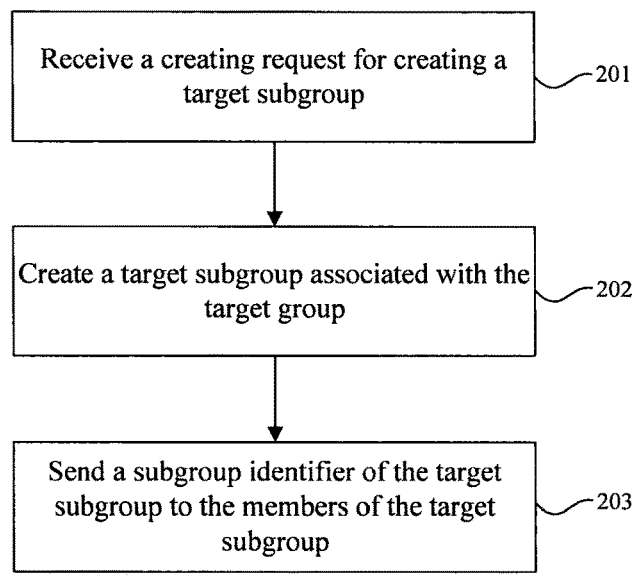
FIG. 2 is a flowchart showing a method for creating a group according to an exemplary embodiment.

FIG. 2 is a flowchart showing an exemplary method for creating a group consistent with embodiments of the disclosure. The method is executed in the server 120 shown in FIG. 1. In this application, unless otherwise specified, "creating a group" refers to creating a subgroup out of an existing group. As shown in FIG. 2, at 201, a creating request for creating a target subgroup is received. The creating request includes a group identifier identifying a target group to which a client sending the creating request belongs. At 202, a target subgroup associated with the target group is created. Members of the target subgroup constitute a subset of members of the target group. At 203, a subgroup identifier of the target subgroup is sent to the members of the target subgroup.

Figure 3:
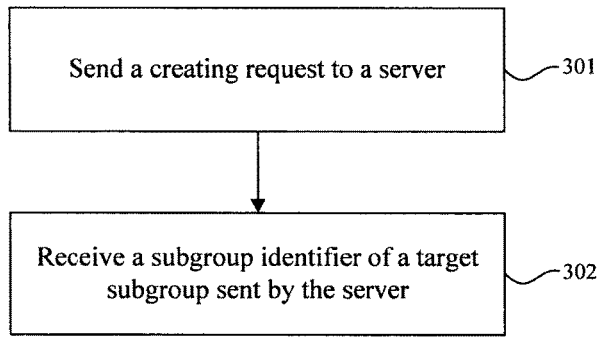
FIG. 3 is a flowchart showing a method for creating a group according to another exemplary embodiment.

FIG. 3 is a flowchart showing an exemplary method for creating a group consistent with embodiments of the disclosure. The method is executed in the client 110 shown in FIG. 1. As shown in FIG. 3, at 301, a creating request for creating a target subgroup is sent to a server. The creating request includes a group identifier identifying a target group. At 302, a subgroup identifier of a target subgroup sent by the server is received. The target subgroup is associated with the target group to which the client belongs, and members of the target subgroup constitute a subset of members of the target group.

Figure 4A:
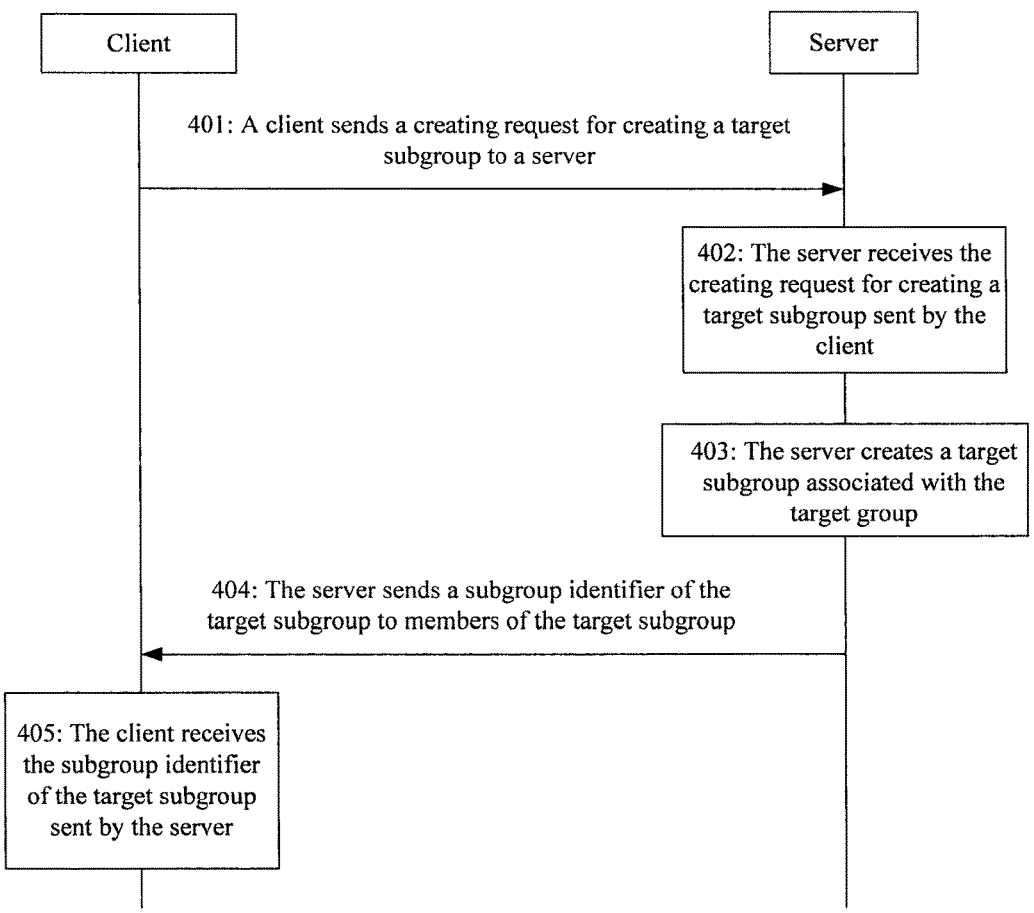
FIG. 4A is a flowchart showing a method for creating a group according to a further exemplary embodiment.

FIG. 4A is a flowchart showing an exemplary method for creating a group consistent with embodiments of the disclosure. The method is executed in the implementation environment shown in FIG. 1. As shown in FIG. 4, at 401, a client sends a creating request for creating a target subgroup to a server.

When a user uses the group function, he or she often needs to communicate only with some users in the group. In such scenario, the user can use his client to send a creating request for creating a target subgroup to the server. The creating request includes a group identifier identifying a target group to which the client sending the creating request belongs.

Figure 4B:
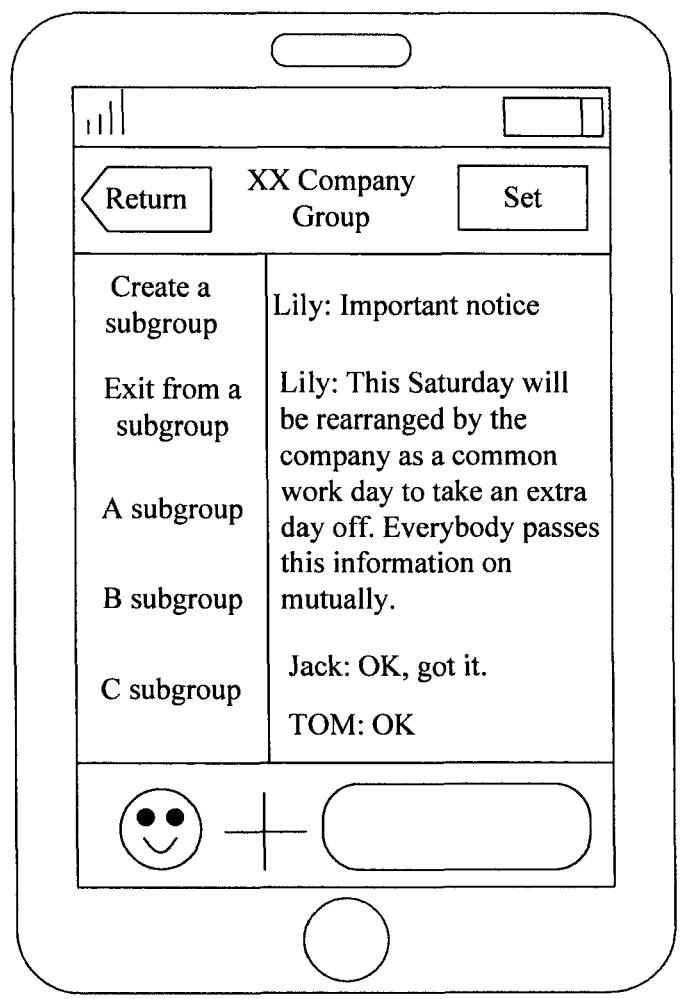
FIG. 4B shows a displayed interface when a client requests to create a subgroup according to a further exemplary embodiment.
Figure 4C:
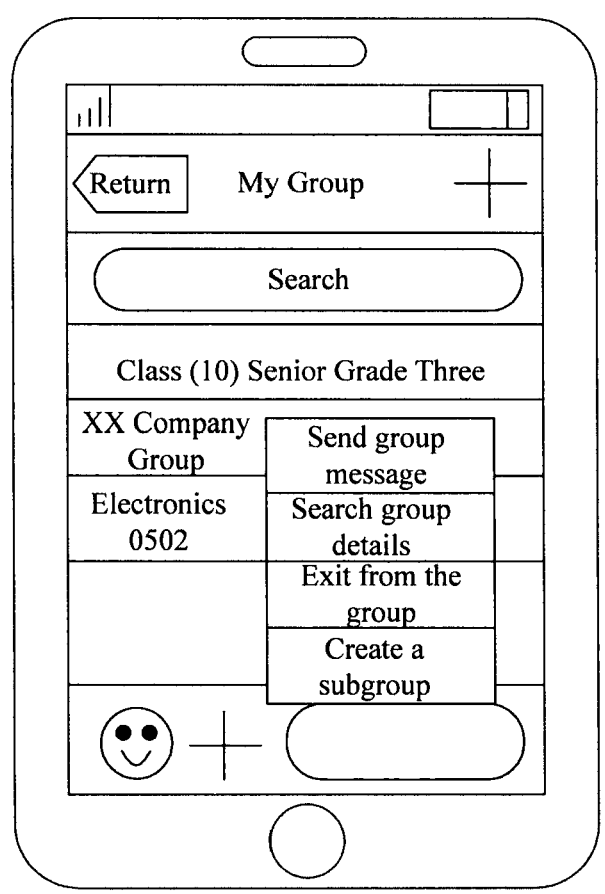
FIG. 4C shows a displayed interface when the client requests to create a subgroup according to a further exemplary embodiment.

For example, referring to FIG. 4B, when the user needs to create a subgroup in a target group "XX Company Group", the user selects an option "Create a Subgroup" in a group message interface of the "XX Company Group" displayed by the client. After receiving a selection signal, the client displays an inquiry interface asking to confirm the creation. After the user confirms the selection, the client sends a creating request for creating a subgroup to the server. As another example shown in FIG. 4C, the user may request to create the subgroup by clicking a group name of the target group in the display interface that displays group names of respective groups, selecting "Create a Subgroup" in a selection menu displayed after the clicking, and then selecting confirms in the later displayed inquiry interface asking to confirm the creation.

Referring again to FIG. 4A, at 402, the server receives the creating request for creating the target subgroup sent by the client.

At 403, the server creates the target subgroup associated with the target group. That is, after receiving the creating request, the server creates the target subgroup associated with the target group. Members of the target subgroup constitute a subset of members of the target group. In some embodiments, when creating the target subgroup, the server also generates a subgroup identifier identifying the target subgroup.

Figure 4D:
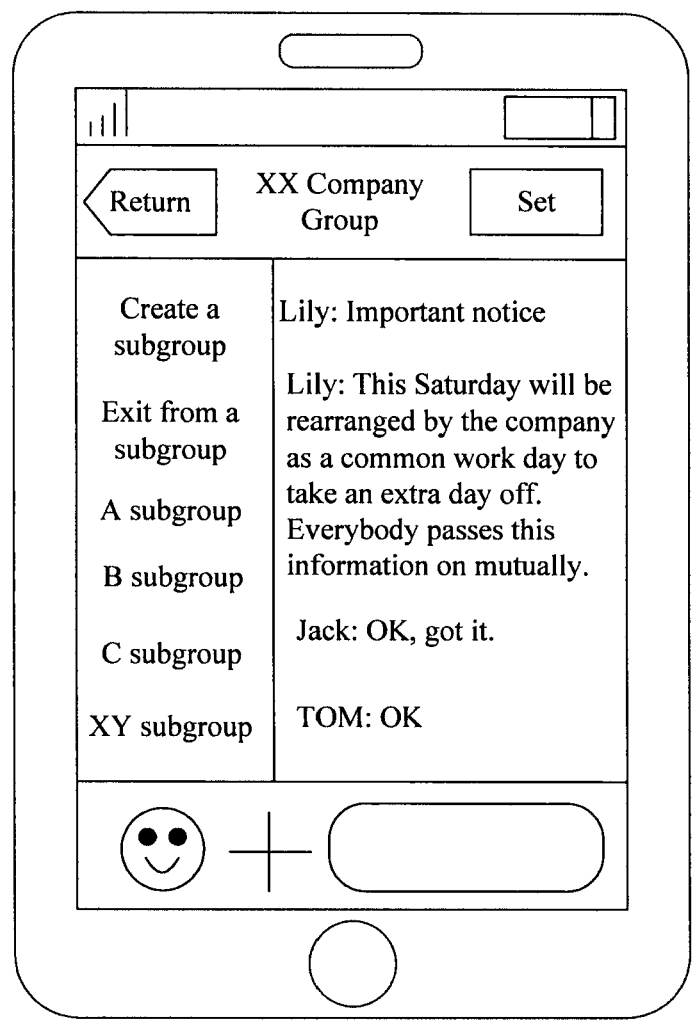
FIG. 4D shows a displayed interface when the client has successfully created the subgroup according to a further exemplary embodiment.
Figure 4E:
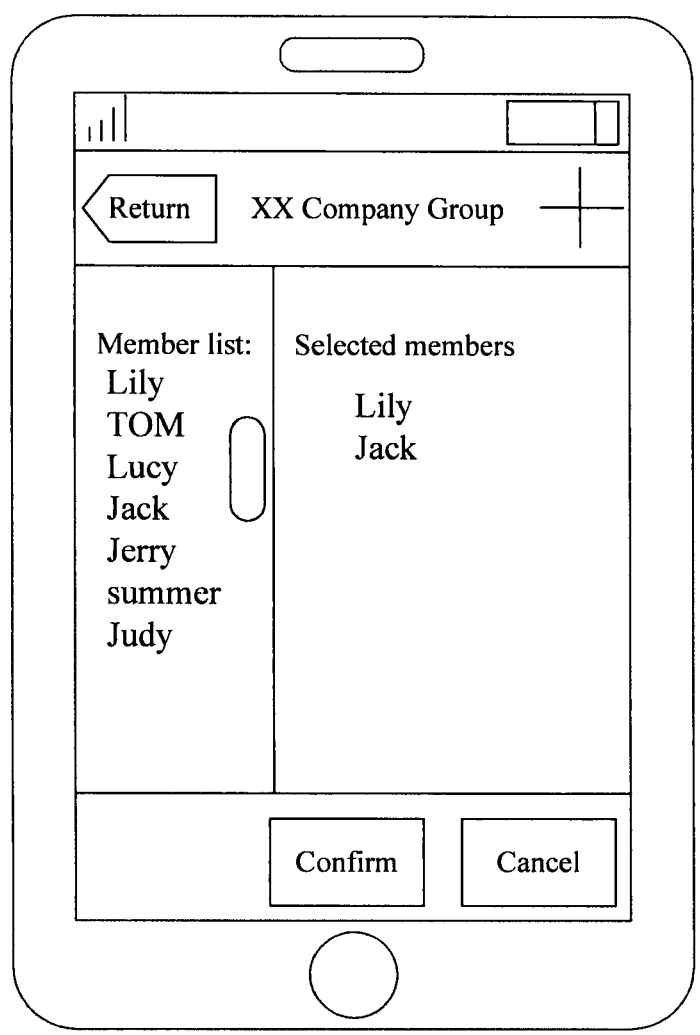
FIG. 4E shows a displayed inquiry interface when the client confirms to create the subgroup according to a further exemplary embodiment.

Furthermore, in order to indicate the creator of the target subgroup, information of the client sending the request (also referred to as a "requesting client") may be included in the creating request. In addition, since the client may invite other group members in the target group to join the target subgroup when requesting to create the target subgroup, the creating request sent by the client may also carry information of other clients invited (also referred to as "invited clients") by the requesting client. That is, the creating request may carry a member list of the target subgroup. For example, as shown in FIG. 4E, after the client receives the selection signal for creating the subgroup, an inquiry interface is displayed, and a member list of the target group is included in the inquiry interface. The user selects other group members who need to be invited from the member list of the target group, and after confirmation by clicking, the client sends the creating request to the server, where the creating request contains the group identifier, the information of the requesting client, and the information of the invited clients. Correspondingly, after receiving the creating request, the server may create the target subgroup corresponding to the member list.

In some embodiments, in order to protect the privacy of other group members, the server may first send invitation messages to other clients for inviting the other group members to join the target subgroup. After the other clients accept the invitation and return confirmation messages, the server then creates the target subgroup corresponding to the member list.

At 404, the server sends a subgroup identifier of the target subgroup to members of the target subgroup. That is, after creating the target subgroup, the server sends the subgroup identifier of the target subgroup to the members of the target subgroup in order to inform the members in the target subgroup that the target subgroup has been successfully created.

At 405, the members of the target subgroup receive the subgroup identifier of the target subgroup sent by the server. In addition, after receiving the subgroup identifier of the target subgroup, the client may store the received subgroup identifier. For example, as shown in FIG. 4D, the client stores the received subgroup identifier "XY" in the target group.

Consistent with embodiments of the disclosure, the number of subgroups that can be created in the target group is not fixed. Moreover, respective subgroups may be created by a same client or by different clients.

As discussed above, the requesting client may invite other clients to join the target subgroup when creating the target subgroup. In some other embodiments, such as shown in FIG. 4F, the requesting client may first create the subgroup, and then invite other clients in the target group to join the target subgroup.

Figure 4F:
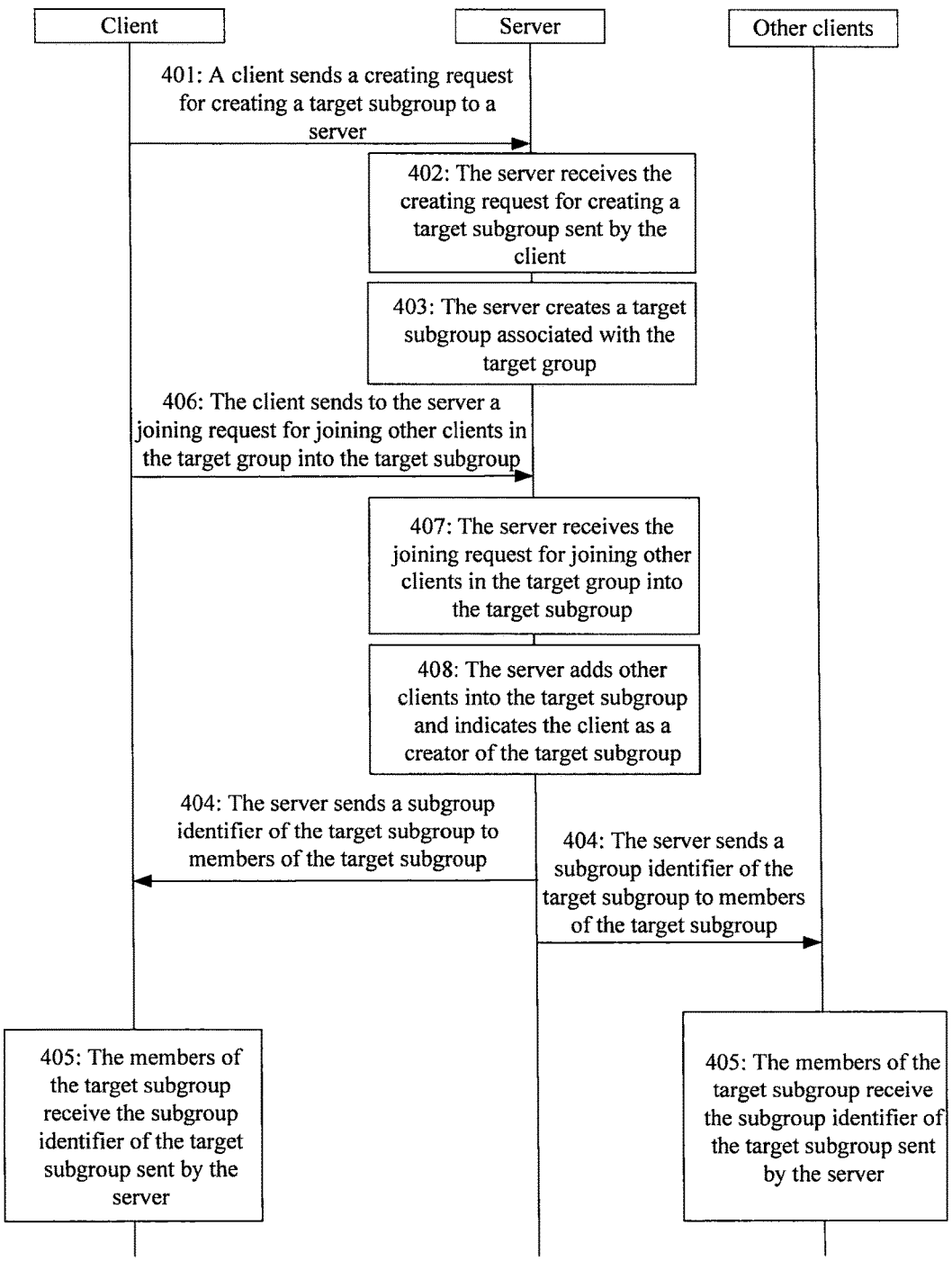
FIG. 4F is a flowchart showing another method for creating a group according to a further exemplary embodiment.

As shown in FIG. 4F, at 406, the requesting client sends to the server a joining request for joining other clients in the target group into the target subgroup.

At 407, the server receives the joining request for joining other clients in the target group into the target subgroup.

At 408, the server adds other clients into the target subgroup and indicates the requesting client as the creator of the target subgroup.

In some embodiments, in order to protect the privacy of other group members, the server may first send invitation messages to other clients for inviting the other group members to join the target subgroup. After the other clients accept the invitation and return confirmation messages, the server then creates the target subgroup corresponding to the member list.

Figure 4G:
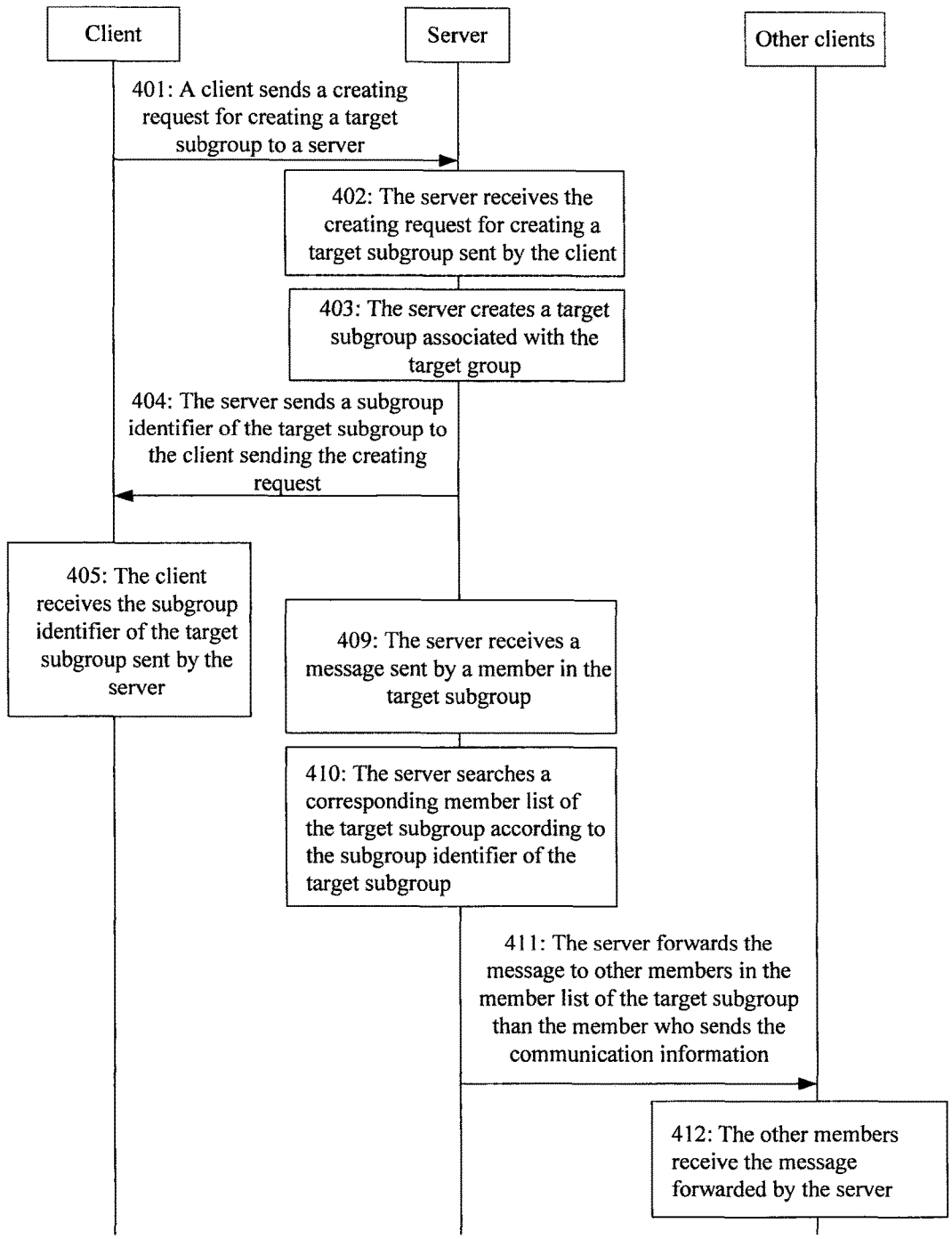
FIG. 4G is a flowchart showing another method for creating a group according to a further exemplary embodiment.
Figure 4H:
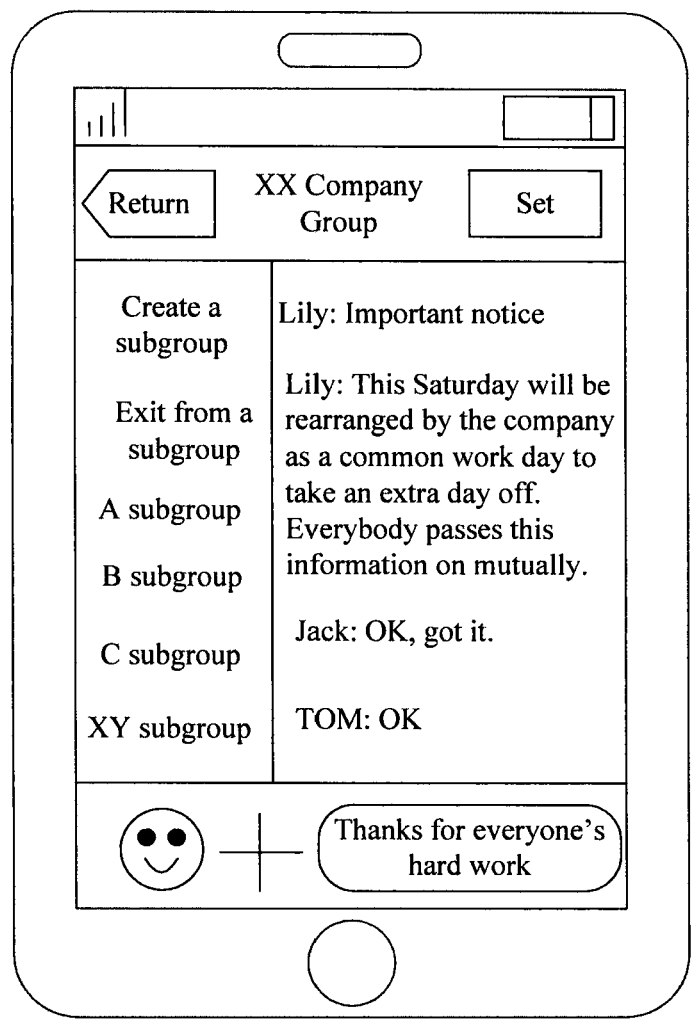
FIG. 4H shows a displayed interface when a client initiates a group chat in a target subgroup according to further exemplary embodiment.

In some embodiments, after the server creates the target subgroup, any member in the target subgroup may initiate a group communication, as shown in FIG. 4G.

At 409, the server receives a message sent by a member in the target subgroup. That is, when a member in the target subgroup initiates a group chat, the member can send the message to the server, and the server can receive the message sent by that member. The message may include the subgroup identifier of the target subgroup. In some embodiments, the message may include message content. For example, referring to FIG. 4H, when the user of the requesting client wishes to initiate a group chat in the target subgroup "XY subgroup", the user clicks "XY subgroup", and then enters in an input box a message like "XX project was well done. Thanks for everyone's hard work," and then clicks to send. After the client used by the member receives the click signal, the client sends a message including the content of "XX project was well done. Thanks for everyone's hard work" and the identifier of "XY subgroup" to the server.

In some embodiments, the message may include other information. For example, in order to indicate the sender of the message, the message may also include an identification of the member who sends the message.

At 410, the server searches a corresponding member list of the target subgroup according to the subgroup identifier of the target subgroup. That is, after receiving the message, in order to perform subsequent steps, the server searches the member list of the target subgroup corresponding to the subgroup identifier in the message.

At 411, the server forwards the message to those members in the member list of the target subgroup other than the member who sends the message.

At 412, the other members receive the message forwarded by the server. Then, contents of the message are displayed in the subgroup to which the subgroup identifier corresponds after the message is received. When the message includes the identification of the member who sends the communication information, other clients also display the sender's identification while displaying the contents of the message. Detailed description is omitted here.

In some embodiments, the creating request sent by the requesting client may employ a same message format as that of a group message in the target group. For example, if the group message includes a sender identifier, a group identifier, a timestamp, and message contents, then the creating request also includes an identifier of the requesting client, a group identifier, a timestamp, and message contents representing a request of creating a subgroup. In addition, the creating request may have a same representation format as that of the group messages. For example, if the group message has an eXtensible Markup Language (XML) format, the creating request may also have an XML format; if the group message has a JavaScript Object Notation (JOSN, a lightweight data-exchange format) format, the creating request may also have a JOSN format; and if the group message has a binary format, the creating request may also have a binary format.

Figure 5:
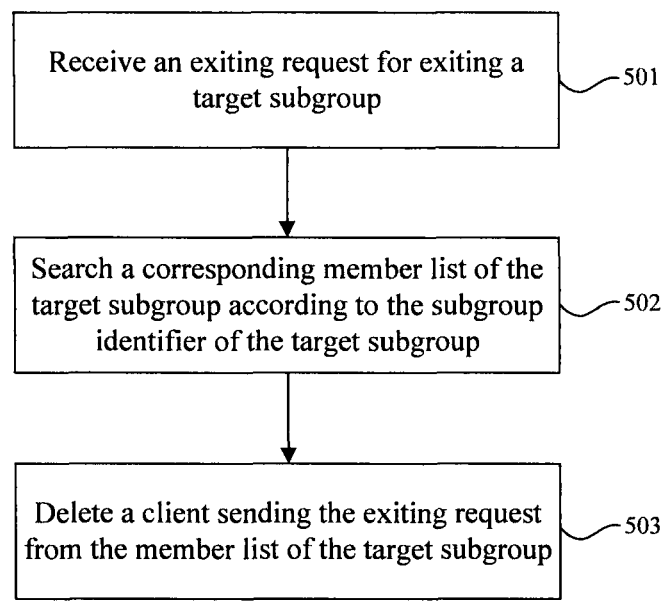
FIG. 5 is a flowchart showing a method for exiting a group according to an exemplary embodiment.

FIG. 5 is a flowchart showing an exemplary method for exiting a group consistent with embodiments of the disclosure. The method is executed in the server 120 shown in FIG. 1.

As shown in FIG. 5, at 501, an exiting request for exiting a target subgroup is received. The exiting request may include a subgroup identifier of the target subgroup. The target subgroup is associated with a target group and members of the target subgroup constitute a subset of members of the target group. At 502, a corresponding member list of the target subgroup is searched according to the subgroup identifier of the target subgroup. At 503, a client sending the exiting request is deleted from the member list of the target subgroup.

Figure 6:
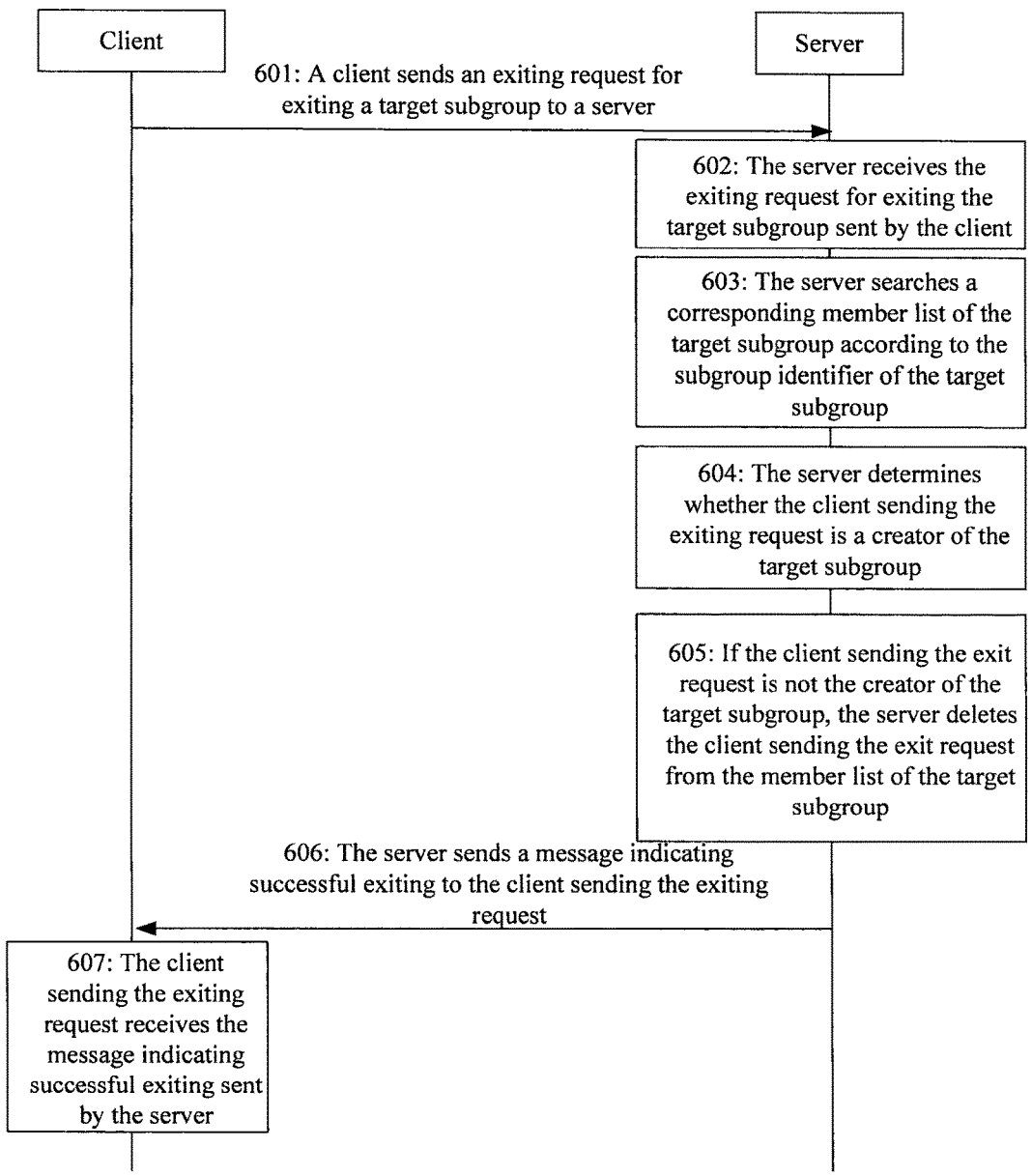
FIG. 6 is a flowchart showing a method for exiting a group according to another exemplary embodiment.

FIG. 6 is a flowchart showing an exemplary method for exiting a group consistent with embodiments of the disclosure. The method is executed in the implementation environment shown in FIG. 1.

As shown in FIG. 6, at 601, a client sends to a server an exiting request for exiting a target subgroup. That is, when a user in the target subgroup wishes to exit the target subgroup, the user can use his client to send to the server the exiting request for exiting the target subgroup. The exiting request includes a subgroup identifier of the target subgroup. The target subgroup is associated with a target group and members of the target subgroup constitute a subset of members of the target group.

At 602, the server receives the exiting request for exiting the target subgroup.

At 603, the server searches a corresponding member list of the target subgroup according to the subgroup identifier of the target subgroup.

At 604, the server determines whether the client sending the exiting request (also referred to as "exiting client") is a creator of the target subgroup. That is, after receiving the exiting request, in order to perform subsequent steps, the server determines whether the exiting client is the creator of the target subgroup. In some embodiments, in order to indicate which client in the target subgroup is requesting to exit, the exiting request may include an identification of the exiting client, and then the server can determine whether the identification of the exiting client is the identification of the creator of the target subgroup in the member list of the target subgroup. If so, the server determines that the exiting client is the creator of the target subgroup. If not, the server determines that the exiting client is not the creator of the target subgroup.

At 605, if the exiting client is not the creator of the target subgroup, the server deletes the exiting client from the member list of the target subgroup. That is, if the exiting client is not the creator of the target subgroup, then the exiting client is an ordinary user in the target subgroup. Therefore, the server can directly delete the exiting client from the member list of the target subgroup.

On the other hand, if the exiting client is the creator of the target subgroup, then the server directly dissolves the target subgroup and the flow ends here. This is similar to the situation in which a group owner exits a group such that the group is dissolved.

At 606, the server sends a message to the exiting client indicating that the exiting was successful (such a message is also referred to as an "exiting-successful" message). That is, after performing the deleting operation, in order to inform the exiting client that it has successfully exited the target subgroup, the server sends an exiting-successful message to the exiting client.

At 607, the exiting client receives the exiting-successful message sent by the server. Thus, the exiting client can be sure that it has successfully exited the target subgroup. The exiting-successful message is a message returned by the server after the server receives the exiting request and deletes the exiting client from the member list of the target subgroup.

Figure 7:
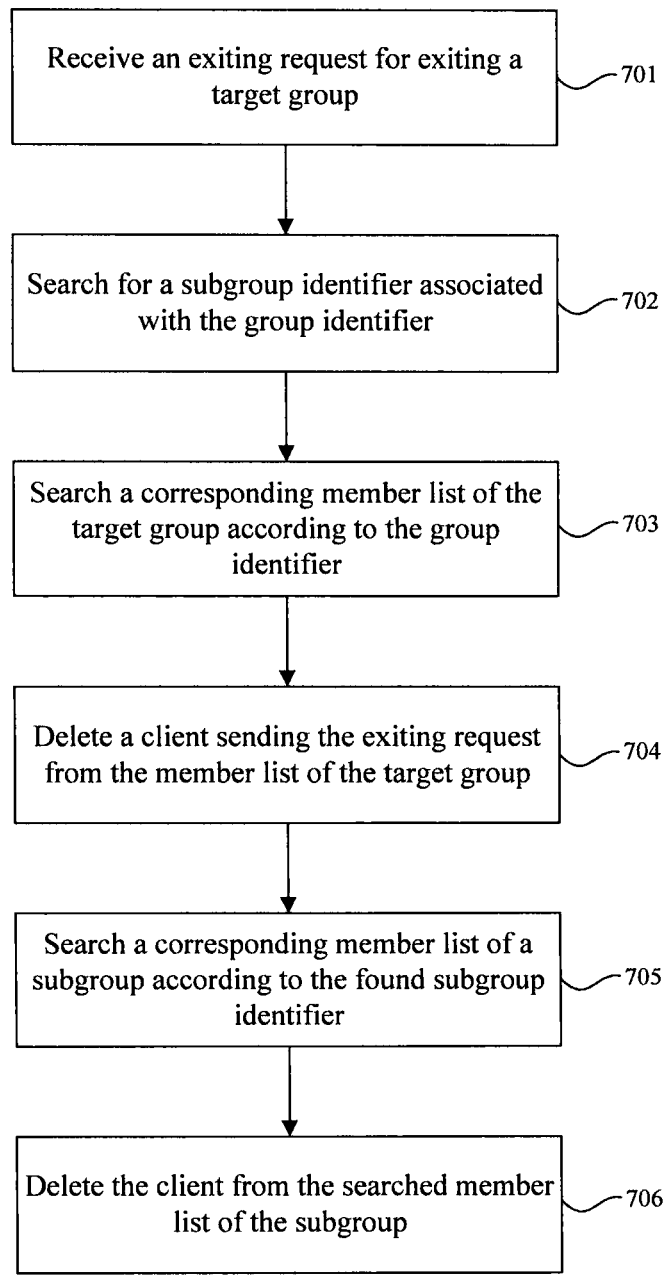
FIG. 7 is a flowchart showing a method for exiting a group according to an exemplary embodiment.

FIG. 7 is a flowchart showing an exemplary method for exiting a group consistent with embodiments of the disclosure. The method is executed in the server 120 shown in FIG. 1. As shown in FIG. 7, at 701, an exiting request for exiting a target group is received. The exiting request includes a group identifier of the target group. At 702, a subgroup identifier associated with the group identifier is searched for. Members of the subgroup to which the found subgroup identifier corresponds constitute a subset of members of the target group. At 703, a corresponding member list of the target group is searched according to the group identifier. At 704, a client sending the exiting request (also referred to as "exiting client") is deleted from the member list of the target group. At 705, a corresponding member list of a subgroup that corresponds to the found subgroup identifier is searched. At 706, the exiting client is deleted from the searched member list of the subgroup.

Figure 8:
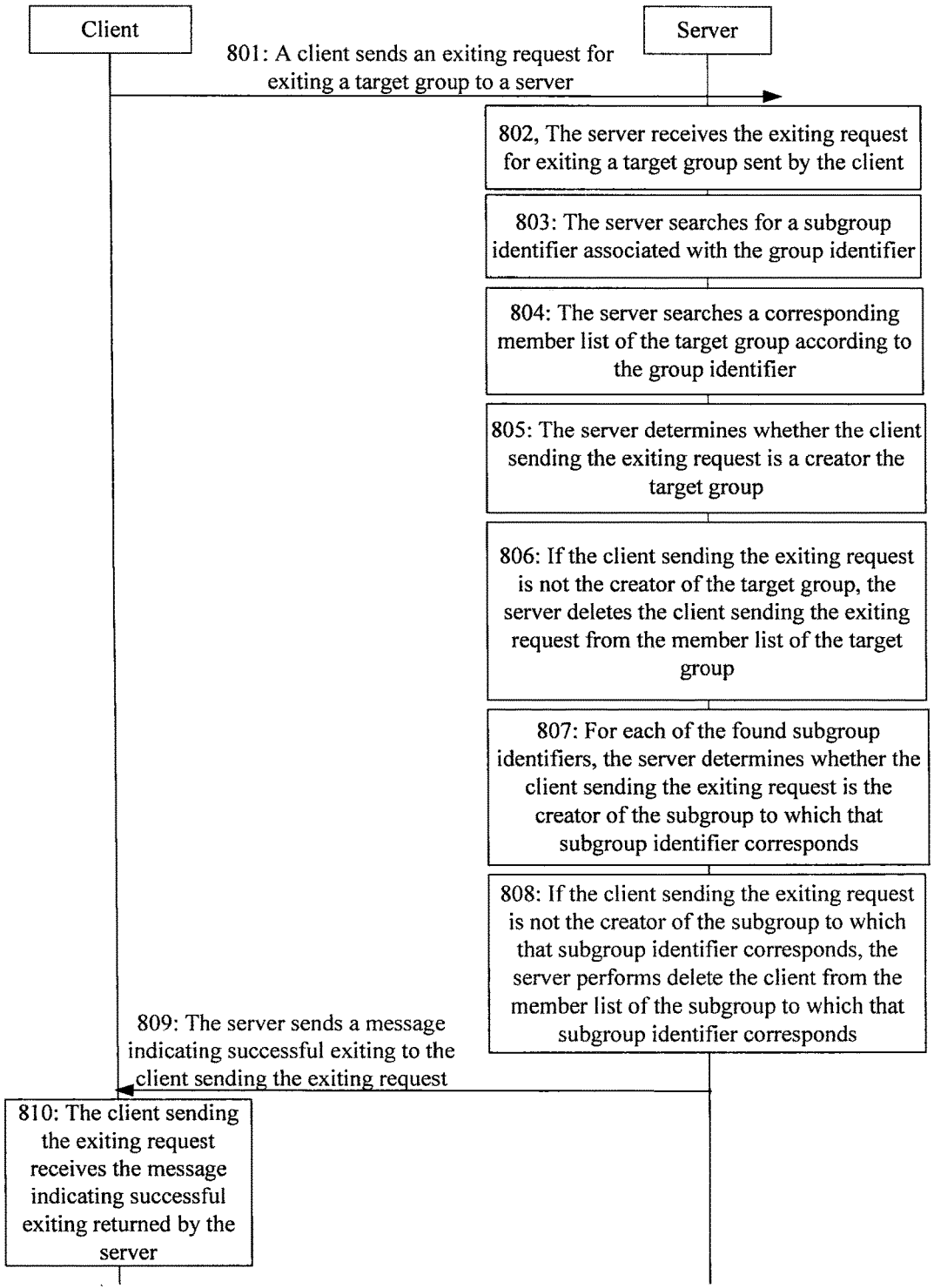
FIG. 8 is a flowchart showing a method for exiting a group according to another exemplary embodiment.

FIG. 8 is a flowchart showing an exemplary method for exiting a group consistent with embodiments of the disclosure. The method is executed in the implementation environment shown in FIG. 1.

As shown in FIG. 8, at 801, a client sends an exiting request for exiting from a target group to a server (such a client is also referred to as an "exiting client"). That is, when a user in the target group wishes to exit the target group, the user can use his client to send to the server the exiting request for exiting the target group. The exiting request includes a group identifier of the target group.

At 802, the server receives the exiting request for exiting the target group sent by the client.

At 803, the server searches for a subgroup identifier associated with the group identifier. That is, after receiving the exiting request, in order to perform subsequent steps, the server searches for the subgroup identifier associated with the group identifier. According to the generation method of the subgroup identifier, it is know that when the subgroup identifier is associated with the group identifier, a subgroup to which the subgroup identifier corresponds is a subgroup of the target group, and thus members of the subgroup to which the found subgroup identifier corresponds constitute a subset of members of the target group.

At 804, the server searches a corresponding member list of the target group according to the group identifier. That is, after receiving the exiting request, in order to perform subsequent steps, the server searches the member list of the target group to which the group identifier in the exiting request corresponds.

In some embodiments, 803 can be performed before 804. In some embodiments, the server may perform 803 and 804 simultaneously, or perform 804 before 803.

At 805, the server determines whether the exiting client is a creator the target group.

That is, after receiving the exiting request, in order to perform subsequent steps, the server determines whether the exiting client is the creator of the target group. In some embodiments, in order to indicate which client in the target group is requesting to exit, the exiting request may include an identification of the exiting client, and then the server can determine whether the identification of the exiting client is the identification of the creator of the target group in the member list of the target group. If so, the server determines that the exiting client is the creator of the target group. If not, the server determines that the exiting client is not the creator of the target group.

At 806, if the exiting client is not the creator of the target group, the server deletes the exiting client from the member list of the target group. That is, if the exiting client is not the creator of the target group, then the exiting client is an ordinary user in the target group. Therefore, the server can directly delete the exiting client from the member list of the target group.

On the other hand, if the exiting client is the creator of the target group, then the server dissolves the target group, similar to the situation in which the owner of an existing group exits the group such that the group is dissolved. Meanwhile, since the target subgroup is associated with the target group, the subgroup in the target group is not worth existing after the target group is dissolved. Therefore, the server can dissolve the subgroup associated with the target group when dissolving the target group, and the flow ends here.

At 807, for each found subgroup identifier, the server determines whether the exiting client is the creator of the subgroup to which that subgroup identifier corresponds. In some embodiments, the server determines whether the identification of the exiting client is the identification of the creator of the subgroup to which that subgroup identifier corresponds. If so, the server determines that the exiting client is the creator of the subgroup to which that subgroup identifier corresponds. If not, the server determines that the exiting client is not the creator of the subgroup to which that subgroup identifier corresponds.

In some embodiments, the target group may include a plurality of subgroups and some of the subgroups include the exiting client but others do not. Therefore, for each of the found subgroup identifiers, the server first determines whether the member list of the subgroup to which that subgroup identifier corresponds includes the identification of the client. If so, the server further determines whether the client is the creator of the subgroup to which that subgroup identifier corresponds. Detailed descriptions are omitted here.

At 808, if the exiting client is not the creator of the subgroup to which the subgroup identifier corresponds, the server deletes the exiting client from the member list of the subgroup to which the subgroup identifier corresponds. That is, if the exiting client is not the creator of the subgroup to which the subgroup identifier corresponds, then the client directly exits the subgroup, i.e., the server deletes the exiting client from the member list of the subgroup to which the subgroup identifier corresponds.

On the other hand, if the exiting client is the creator of the subgroup to which the subgroup identifier corresponds, which indicates that the exiting client is the host of the subgroup, then the server dissolves the subgroup.

At 809, the server sends a message to the exiting client indicating that the exiting was successful (such a message is also referred to as an "exiting-successful" message). That is, after performing the deleting operation, in order to inform the exiting client that it has successfully exited the target group and the subgroup of the target group, the server sends the exiting-successful message to the exiting client. The exiting-successful message indicates that the exiting client has successfully exited the target group and the subgroup that is created in the target group and includes the exiting client.

At 810, the exiting client receives the exiting-successful message returned by the server. That is, the exiting client has successfully exited the target group and the subgroup of the target group, and thereafter, the exiting client will not receive messages in the target group and messages in the subgroup of the target group. Therefore, interference from the messages in the subgroup of the target group after the exiting client has exited the target group is avoided, and the user experience is improved.

Apparatuses consistent with embodiments of the disclosure are described below, which may be configured to perform the methods consistent with embodiments of the disclosure, such as methods described above, which can be referred to for any features not discussed in detail in the description below.

Figure 9:
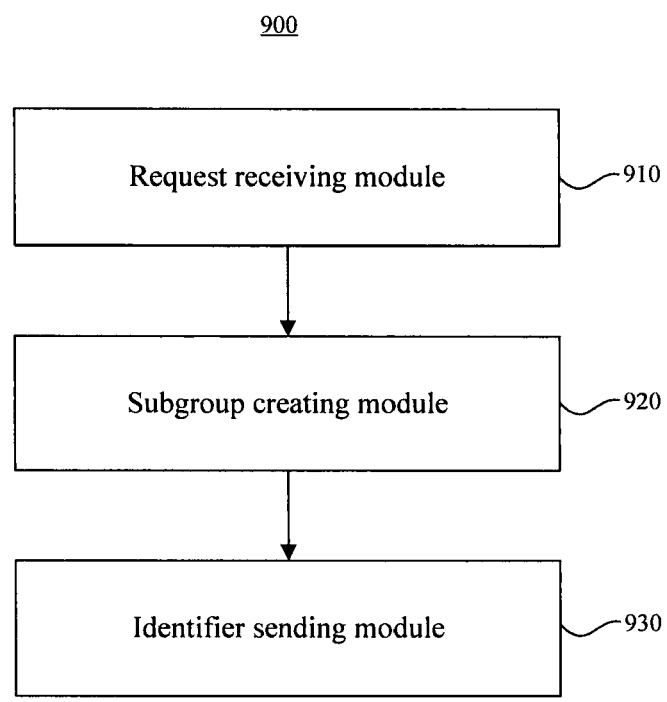
FIG. 9 is a block diagram showing an apparatus for creating a group according to an exemplary embodiment.

FIG. 9 is a block diagram showing an exemplary apparatus 900 for creating a group consistent with embodiments of the disclosure. The apparatus 900 may be implemented as a part of the server 120 shown in FIG. 1. As shown in FIG. 9, the apparatus 900 includes a request receiving module 910, a subgroup creating module 920, and an identifier sending module 930.

The request receiving module 910 is configured to receive a creating request for creating a target subgroup. The creating request includes a group identifier of a target group to which a client sending the creating request belongs.

The subgroup creating module 920 is configured to create the target subgroup associated with the target group.

The identifier sending module 930 is configured to send a subgroup identifier of the target subgroup to members of the target subgroup. The members of the target subgroup constitute a subset of members of the target group.

Figure 10A:
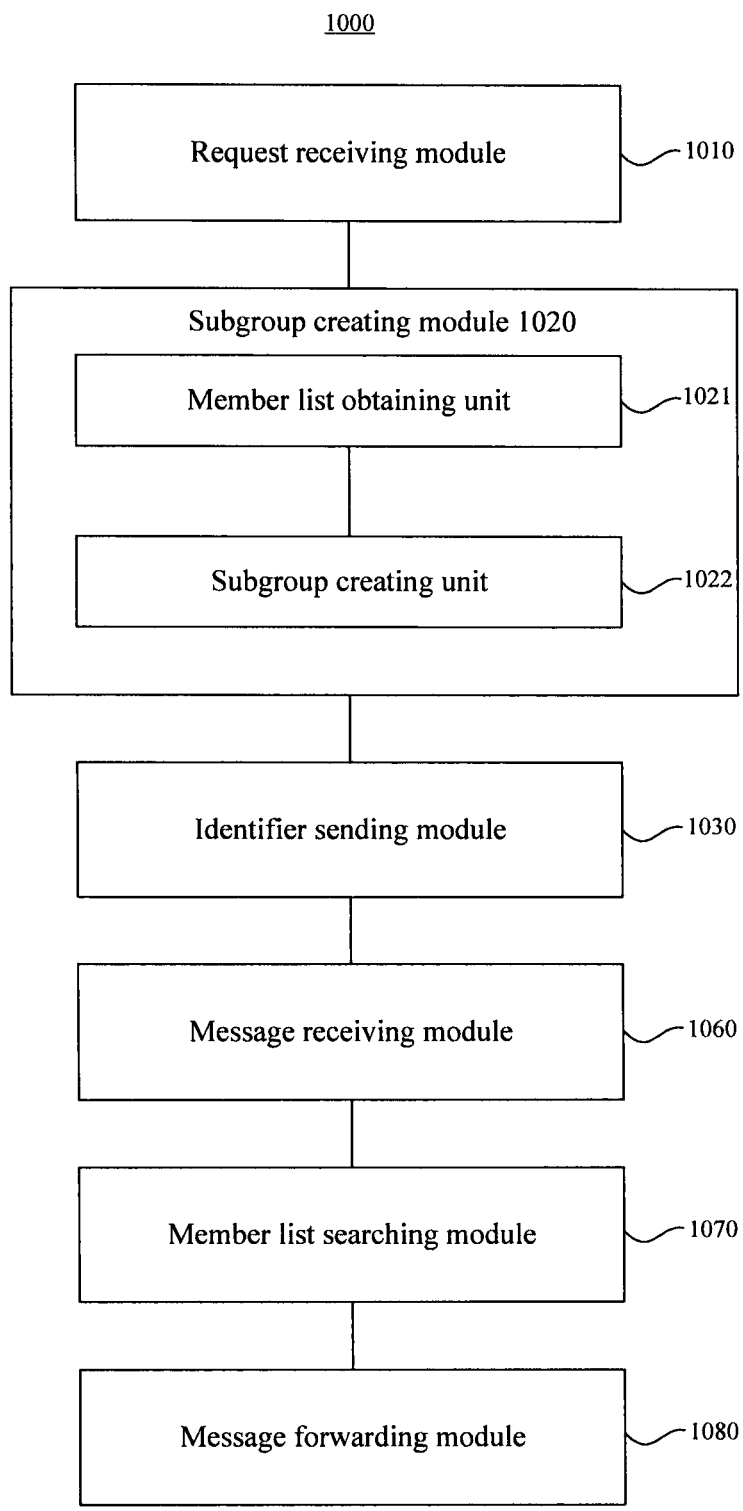
FIG. 10A is a block diagram showing an apparatus for creating a group according to another exemplary embodiment.
Figure 10B:
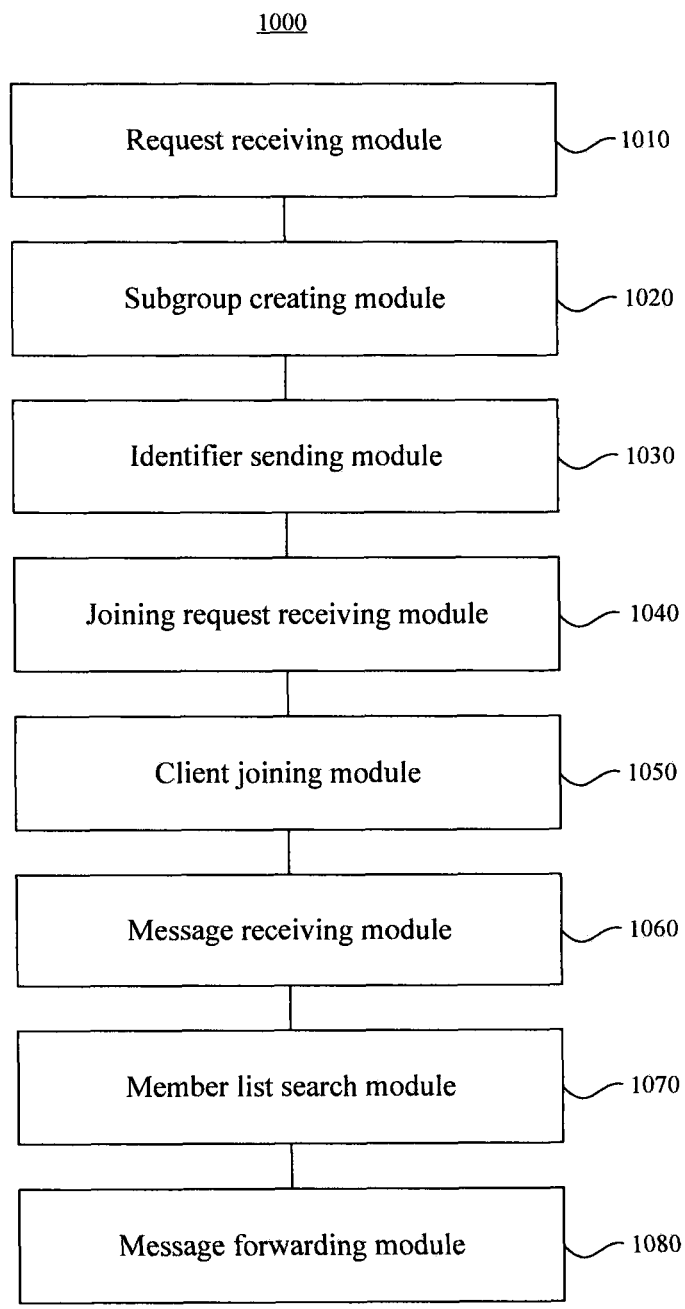
FIG. 10B is a block diagram showing another apparatus for creating a group according to another exemplary embodiment.

FIGS. 10A and 10B are block diagrams showing an exemplary apparatus 1000 for creating a group consistent with embodiments of the disclosure. The apparatus 1000 may be implemented as a part of the server 120 shown in FIG. 1. The apparatus 1000 includes a request receiving module 1010, a subgroup creating module 1020, and an identifier sending module 1030.

The request receiving module 1010 is configured to receive a creating request for creating a target subgroup. The creating request includes a group identifier of a target group to which a client sending the creating request belongs.

The subgroup creating module 1020 is configured to create the target subgroup associated with the target group.

The identifier sending module 1030 is configured to send a subgroup identifier of the target subgroup to members of the target subgroup. The members of the target subgroup constitute a subset of members of the target group.

In some embodiments, as shown in FIG. 1 OA, the subgroup creating module 1020 includes a member list obtaining unit 1021 and a subgroup creating unit 1022. The member list obtaining unit 1021 is configured to obtain a member list carried in the creating request. The member list of the target subgroup includes the client sending the creating request. The subgroup creating unit 1022 is configured to create the target subgroup corresponding to the member list.

In some embodiments, as shown in FIG. 10B, the apparatus 1000 further includes a joining request receiving module 1040 configured to receive a joining request for joining clients in the target group into the target subgroup and a client joining module 1050 configured to join the clients in the target group into the target subgroup.

In some embodiments, as shown in FIGS. 10A and 10B, the apparatus 1000 further includes a message receiving module 1060, a member list searching module 1070, and a message forwarding module 1080. The message receiving module 1060 is configured to receive messages sent by the members of the target subgroup. A message may include the subgroup identifier of the target subgroup. The member list searching module 1070 is configured to search a corresponding member list of the target subgroup according to the subgroup identifier of the target subgroup. The message forwarding module 1080 is configured to forward a received message to members in the member list of the target subgroup found by the member list searching module 1070 other than the member sending the message.

Figure 11:
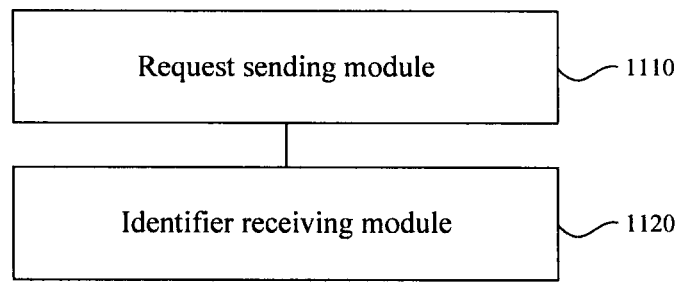
FIG. 11 is a block diagram showing an apparatus for creating a group according to a further exemplary embodiment.

FIG. 11 is a block diagram showing an exemplary apparatus 1100 for creating a group consistent with embodiments of the disclosure. The apparatus 1100 may be implemented as a part of the client 110 shown in FIG. 1. The apparatus 1100 includes a request sending module 1110 and an identifier receiving module 1120.

The request sending module 1110 is configured to send to a server a creating request for creating a target subgroup. The creating request includes a group identifier of a target group.

The identifier receiving module 1120 is configured to receive a subgroup identifier of the target subgroup sent by the server.

The target subgroup is associated with the target group to which the client belongs, and members of the target subgroup constitute a subset of members of the target group.

Figure 12:
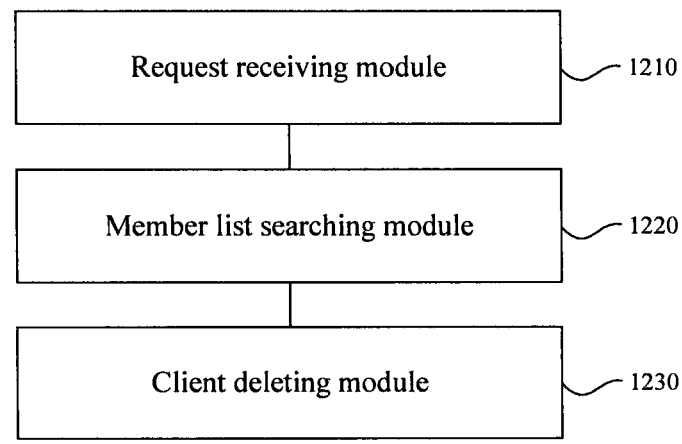
FIG. 12 is a block diagram showing an apparatus for exiting a group according to an exemplary embodiment.

FIG. 12 is a block diagram showing an exemplary apparatus 1200 for exiting a group consistent with embodiments of the disclosure. The apparatus 1200 may be implemented as a part of the server 120 shown in FIG. 1. The apparatus 1200 includes a request receiving module 1210, a member list searching module 1220, and a client deleting module 1230.

The request receiving module 1210 is configured to receive an exiting request for exiting a target subgroup. The exiting request includes a subgroup identifier of the target subgroup.

The member list searching module 1220 is configured to search a corresponding member list of the target subgroup according to the subgroup identifier of the target subgroup.

The client deleting module 1230 is configured to delete a client sending the exiting request from the member list of the target subgroup.

The target subgroup is associated with a target group, and members of the target subgroup constitute a subset of members of the target group.

Figure 13:
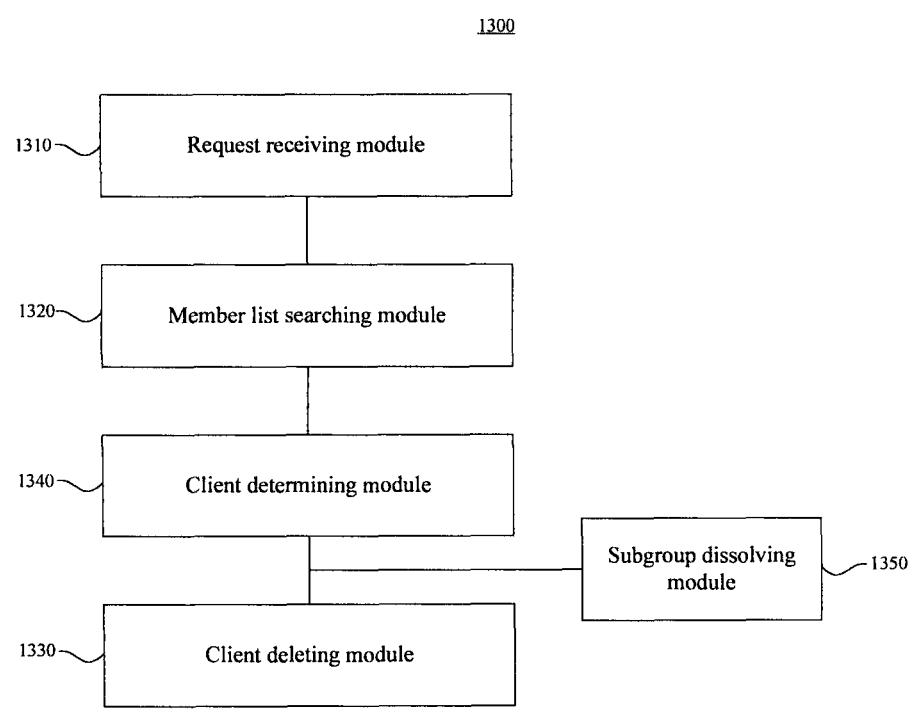
FIG. 13 is a block diagram showing an apparatus for exiting a group according to another exemplary embodiment.

FIG. 13 is a block diagram showing an exemplary apparatus 1300 for exiting from a group consistent with embodiments of the disclosure. The apparatus 1300 may be implemented as a part of the server 120 shown in FIG. 1. The apparatus 1300 includes a request receiving module 1310, a member list searching module 1320, and a client deleting module 1330.

The request receiving module 1310 is configured to receive an exiting request for exiting a target subgroup. The exiting request includes a subgroup identifier of the target subgroup.

The member list searching module 1320 is configured to search a corresponding member list of the target subgroup according to the subgroup identifier of the target subgroup.

The client deleting module 1330 is configured to delete a client sending the exiting request (also referred to as "exiting client") from the member list of the target subgroup.

The target subgroup is associated with a target group, and members of the target subgroup constitute a subset of members of the target group.

In some embodiments, as shown in FIG. 13, the apparatus 1300 further includes a client determining module 1340 and a subgroup dissolving module 1350.

The client determining module 1340 is configured to determine whether the client sending the exiting request is a creator of the target subgroup. If the exiting client is the creator of the target subgroup, the subgroup dissolving module 1350 dissolves the target subgroup. If the exiting client is not the creator of the target subgroup, the client deleting module 1330 deletes the exiting client from the member list of the target subgroup.

Figure 14:
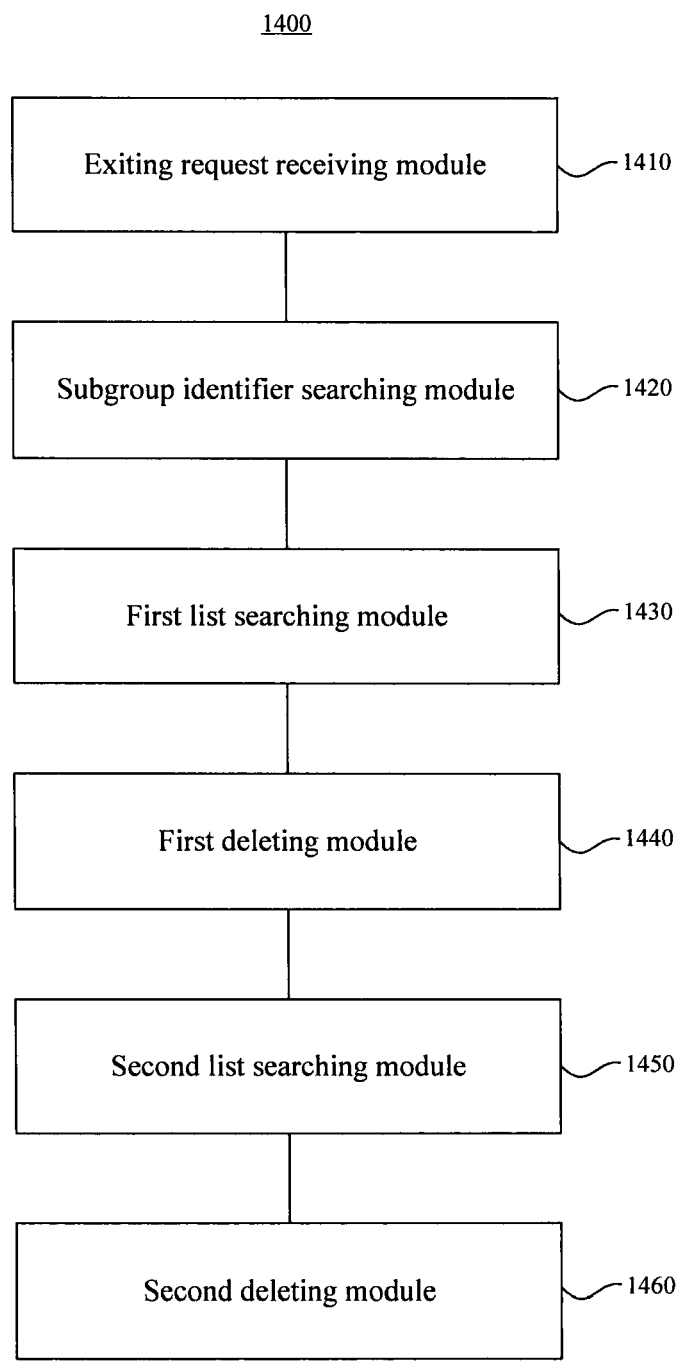
FIG. 14 is a block diagram showing an apparatus for exiting a group according to an exemplary embodiment.

FIG. 14 is a block diagram showing an exemplary apparatus 1400 for exiting a group consistent with embodiments of the disclosure. The apparatus 1400 may be implemented as a part of the server 120 shown in FIG. 1. The apparatus 1400 includes an exiting request receiving module 1410, a subgroup identifier searching module 1420, a first list searching module 1430, a first deleting module 1440, a second list searching module 1450, and a second deleting module 1460.

The exiting request receiving module 1410 is configured to receive an exiting request for exiting a target group. The exiting request includes a group identifier of the target group.

The subgroup identifier searching module 1420 is configured to search for a subgroup identifier associated with the group identifier. Members of a subgroup to which the found subgroup identifier corresponds constitute a subset of members of the target group.

The first list searching module 1430 is configured to search a corresponding member list of the target group according to the group identifier.

The first deleting module 1440 is configured to delete a client sending the exiting request (also referred to as "exiting client") from the member list of the target group.

The second list searching module 1450 is configured to search a corresponding member list of the subgroup according to the found subgroup identifier.

The second deleting module 1460 is configured to delete the exiting client from the searched member list of the subgroup.

Figure 15:
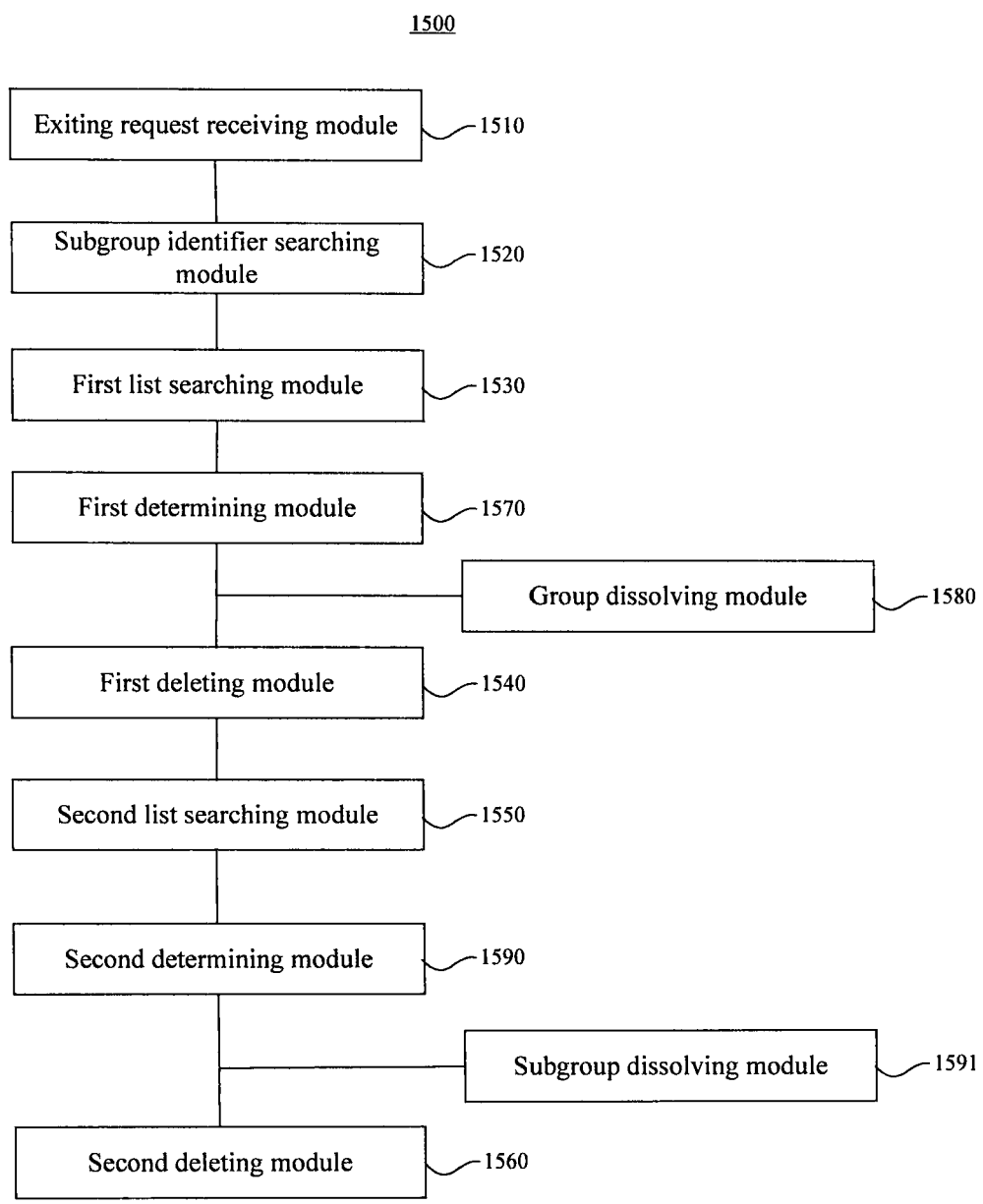
FIG. 15 is a block diagram showing an apparatus for exiting a group according to another exemplary embodiment.

FIG. 15 is a block diagram showing an exemplary apparatus 1500 for exiting a group consistent with embodiments of the disclosure. The apparatus 1500 may be implemented as a part of the server 120 shown in FIG. 1. The apparatus 1500 includes an exiting request receiving module 1510, a subgroup identifier searching module 1520, a first list searching module 1530, a first deleting module 1540, a second list searching module 1550, and a second deleting module 1560.

The exiting request receiving module 1510 is configured to receive an exit request for exiting from a target group in which a group identifier of the target group is included.

The subgroup identifier searching module 1520 is configured to search for a subgroup identifier associated with the group identifier. Members of a subgroup to which the searched subgroup identifier corresponds constitute a subset of members of the target group.

The first list searching module 1530 is configured to search a corresponding member list of the target group according to the group identifier.

The first deleting module 1540 is configured to delete a client sending the exit request (also referred to as "exiting client") from the member list of the target group.

The second list searching module 1550 is configured to search a corresponding member list of the subgroup according to the searched subgroup identifier.

The second deleting module 1560 is configured to delete the exiting client from the searched member list of the subgroup.

In some embodiments, as shown in FIG. 15, the apparatus 1500 further includes a first determining module 1570 and a group dissolving module 1580. The first determining module 1570 is configured to determine whether the exiting client is a creator of the target group. If the exiting client is the creator of the target group, the group dissolving module 1580 dissolves the target group and any subgroups associated with the target group. If the exiting client is not the creator of the target group, the first deleting module 1540 deletes the exiting client from the member list of the target group.

In some embodiments, as shown in FIG. 15, the apparatus 1500 further includes a second determining module 1590 and a subgroup dissolving module 1591. The second determining module 1590 is configured to, for each of the found subgroup identifiers found by the subgroup identifier searching module 1520, determine whether the exiting client is a creator of a subgroup to which that subgroup identifier corresponds. If the exiting client is the creator of the subgroup to which that subgroup identifier corresponds, the subgroup collapsing module 1591 dissolves the subgroup to which that subgroup identifier corresponds. If the exiting client is not the creator of the subgroup to which that subgroup identifier corresponds, the second deleting module 1560 deletes the exiting client from the searched member list of the subgroup.

Figure 16:
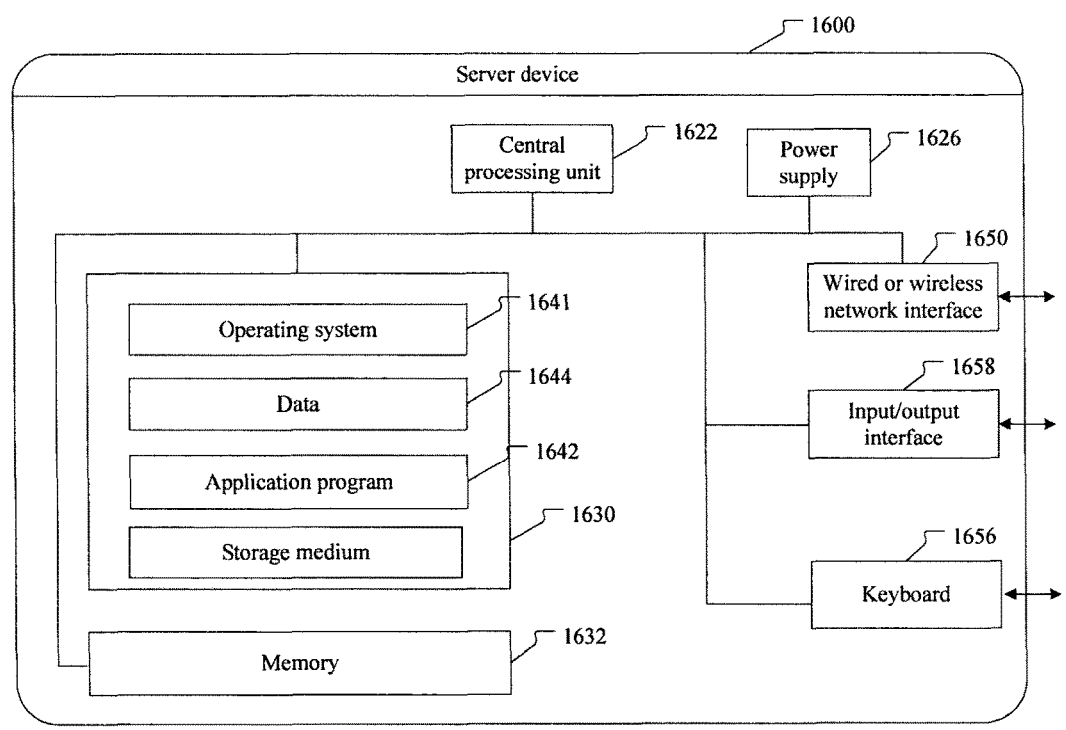
FIG. 16 is a block diagram showing a server according to an exemplary embodiment.

FIG. 16 is a block diagram showing structures of an exemplary server 1600 consistent with embodiments of the disclosure. As shown in FIG. 16, the server 1600 includes one or more Central Processing Units (CPUs) 1622 (for example, one or more processors), a memory 1632, one or more storage mediums 1630 (for example, one or more mass storage devices) for storing an application program 1642 or data 1644. The memory 1632 and the storage medium 1630 may perform temporary storage or permanent storage. The program stored in the storage medium 1630 may include instructions controlling operations of the server 1600. Further, the CPU 1622 is configured to communicate with the storage medium 1630, and to perform the instructions stored in the storage medium 1630 so as to complete all or a part of the methods consistent with embodiments of the disclosure.

The server 1600 further includes one or more power supplies 1626, one or more wired or wireless network interfaces 1650, one or more input/output interfaces 1658, one or more keyboards 1656 and/or one or more operating systems 1641, such as WINDOWS SERVER™, MAC OS X™, UNIX™, LINUX™, or FREEBSD™, and the like.

Figure 17:
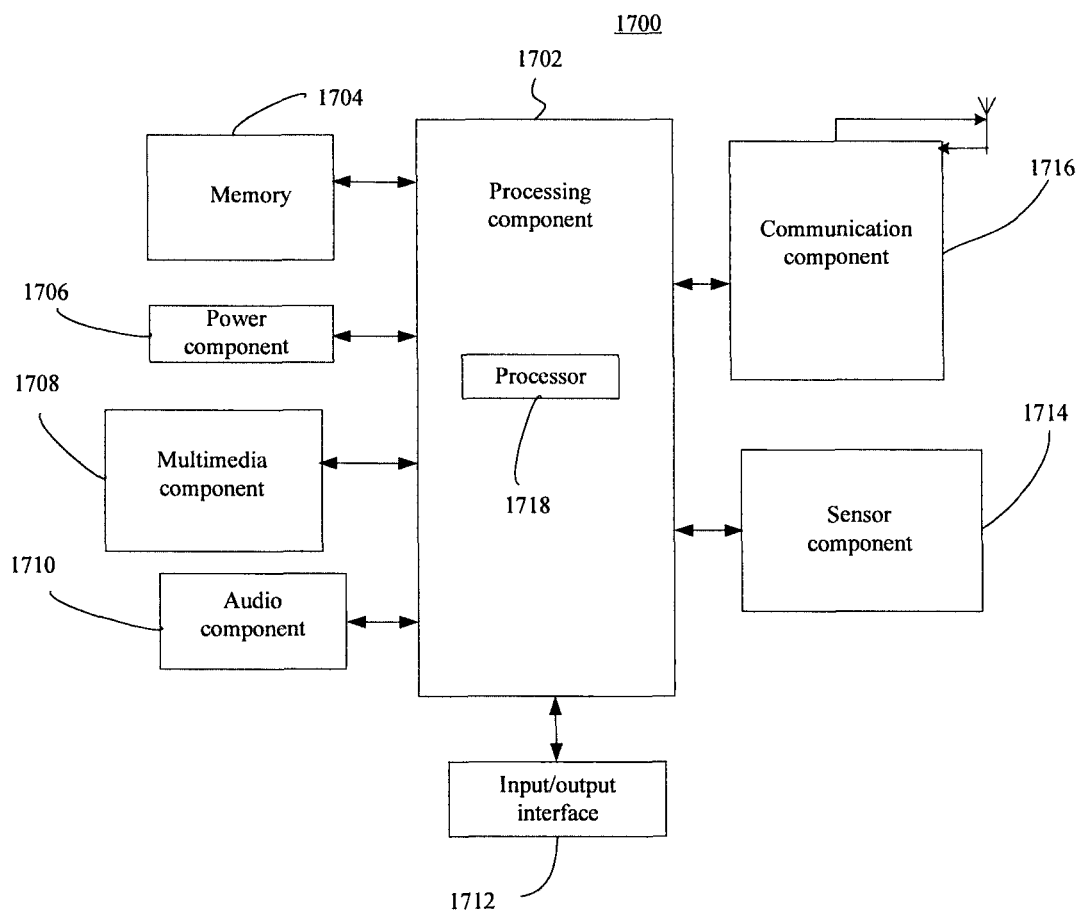
FIG. 17 is a block diagram showing a terminal according to an exemplary embodiment.

FIG. 17 is a block diagram showing an exemplary terminal 1700 consistent with embodiments of the disclosure. The client 110 may be executed in the terminal 1700. For example, the terminal 1700 may be a mobile phone, a computer, a digital broadcast terminal, a messaging device, a gaming console, a tablet, a medical device, exercise equipment, a personal digital assistant, and the like.

Referring to FIG. 17, the terminal 1700 includes one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 controls overall operations of the terminal 1700, such as the operations associated with display, telephone calls, data communications, camera operations, and recording operations. The processing component 1702 may include one or more processors 1718 to execute instructions to perform all or part of methods consistent with embodiments of the disclosure. Moreover, the processing component 1702 may include one or more modules which facilitate the interaction between the processing component 1702 and other components. For instance, the processing component 1702 may include a multimedia module to facilitate the interaction between the multimedia component 1708 and the processing component 1702.

The memory 1704 is configured to store various types of data to support the operation of the terminal 1700. Examples of such data include instructions for any applications or methods operated on the terminal 1700, contact data, phonebook data, messages, pictures, video, and so on. The memory 1704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1706 provides power to various components of the terminal 1700. The power component 1706 may include a power management system, one or more power supplies, one or more power management modes, and other components associated with the generation, management, and distribution of power in the terminal 1700.

The multimedia component 1708 includes a screen providing an output interface between the terminal 1700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1708 includes a front camera and/or a rear camera. The front camera and the rear camera may receive an external multimedia datum while the terminal 1700 is in an operation mode, such as a photographing mode or a video mode. Each of the front camera and the rear camera may be a fixed optical lens system or have focus and optical zoom capability.

The audio component 1710 is configured to output and/or input audio signals. For example, the audio component 1710 includes a microphone (MIC) configured to receive an external audio signal when the terminal 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker to output audio signals.

The I/O interface 1712 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide status assessments of various aspects of the terminal 1700. For instance, the sensor component 1714 may detect an open/closed status of the terminal, relative positioning of components, e.g., the display and the keypad, of the terminal 1700, a change in position of the terminal 1700 or a component of terminal 1700, a presence or absence of user contact with the terminal 1700, an orientation or an acceleration/deceleration of the terminal 1700, and a change in temperature of the terminal 1700. The sensor component 1714 may include a proximity sensor configured to detect the presence of nearby objects without any physical contact. The sensor component 1714 may also include a light sensor, such as a CMOS or CCD image sensor, for use in imaging applications. In some embodiments, the sensor component 1714 may also include an accelerometer sensor, a gyroscope sensor, a magnetic sensor, a pressure sensor, or a temperature sensor. The temperature sensor may be used for sampling temperatures in natural environment and/or human body temperature.

The communication component 1716 is configured to facilitate communication, wired or wirelessly, between the terminal 1700 and other devices. The terminal 1700 can access a wireless network based on a communication standard, such as WiFi, 2G or 3G, or a combination thereof. In one exemplary embodiment, the communication component 1716 receives a broadcast signal or broadcast associated information from an external broadcast management system via a broadcast channel. In one exemplary embodiment, the communication component 1716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1704, executable by the processor 1720 in the terminal 1700, for performing the methods consistent with embodiments of the disclosure. For example, the non-transitory computer-readable storage medium may be a ROM, a RAM, a CD-ROM, a magnetic tape, a floppy disc, an optical data storage device, and the like.

Consistent with embodiments of the disclosure, a new group would not include members who do not belong to the target group and thus the server does not need to forward messages in the new group to the other members (that do not belong to the target group). As a result, the server resource would not be wasted. Meanwhile, since the server does not send messages in the new group to the other members who do not belong to the target group, information within the new group would not be leaked, and thus the communication in the target subgroup is kept safe.

In some embodiments, a subgroup member in the target subgroup may request to exit the subgroup (such a member is also referred to as an "exiting member"). Thereafter, the server does not need to send to the exiting member messages that are not valuable to the exiting member. As a result, the server resource may be further saved. Meanwhile, interference on the exiting member by the messages in the subgroup can be avoided and thereby the user experience can be improved.

In some embodiments, when a client exits a target group, it also exits subgroups of the target group. Thereafter, the server does not need to send to the exiting members messages that are not valuable to the exiting member. As a result, the server resource would not be wasted. Meanwhile, since the server does not send messages in the subgroup of the target group to clients that have exited the target group, information within the subgroup would not be leaked, and thus the communication in the subgroup is kept safe.

In some embodiments, if a client requesting to exit is the creator of the target group, the target group and the subgroups in the target group are dissolved. Similarly, if the client is the creator of a subgroup, that subgroup is dissolved. As a result, wasting of server resource by the server continuing to send messages to a subgroup is avoided.

Those skilled in the art will recognize that part or all of the methods described above may be implemented with hardware, or programs instructing the related hardware. The programs may be stored in a computer readable storage medium. The storage medium described above may be a read-only memory, a magnetic disc, an optical disc or the like.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for exiting a group in an instant messaging application, the method being implemented in a server including at least one processor and a memory storing instructions executable by the at least one processor, and the method comprising:
   receiving, by the at least one processor, an exiting request for exiting a target group in the instant messaging application, the exiting request being sent by a client and including a group identifier of the target group;
   in response to receiving the exiting request for exiting the target group, searching, by the at least one processor, for a subgroup identifier associated with the group identifier and not included in the exiting request, a subgroup to which the subgroup identifier corresponds being a subgroup of the target group and members of the subgroup constituting a subset of members of the target group;
   searching, by the at least one processor, a member list of the target group according to the group identifier;
   determining whether the client is a creator of the target group;
   if the client is the creator of the target group, dissolving the target group and the subgroup; and
   if the client is not the creator of the target group,
      deleting, by the at least one processor, the client from the member list of the target group,
      searching, by the at least one processor, a member list of the subgroup according to the subgroup identifier, and
      deleting, by the at least one processor, the client from the member list of the subgroup.

2. The method according to claim 1, further comprising:
   determining whether the client is a creator of the subgroup;
   if the client is the creator of the subgroup, dissolving the subgroup; and
   if the client is not the creator of the subgroup, deleting the client from the member list of the subgroup.

3. An apparatus for exiting from a group in an instant messaging application, the apparatus comprising:
   a processor; and
   a non-transitory computer-readable storage medium storing instructions that, when executed by the processor, cause the processor to:
      receive an exiting request for exiting a target group in the instant messaging application, the exiting request being sent by a client and including a group identifier of the target group;
      in response to receiving the exiting request for exiting the target group, search for a subgroup identifier associated with the group identifier and not included in the exiting request, a subgroup to which the subgroup identifier corresponds being a subgroup of the target group and members of the subgroup constituting a subset of members of the target group;
      search a member list of the target group according to the group identifier;
      determine whether the client is a creator of the target group;
      if the client is the creator of the target group, dissolve the target group and the subgroup; and
      if the client is not the creator of the target group,
         delete the client from the member list of the target group,
         search a member list of the subgroup according to the subgroup identifier, and
         delete the client from the member list of the subgroup.

4. A non-transitory computer-readable storage medium storing instructions that, when executed by a processor, cause the processor to:
   receive an exiting request for exiting a target group in an instant messaging application, the exiting request being sent by a client and including a group identifier of the target group;
   in response to receiving the exiting request for exiting the target group, search for a subgroup identifier associated with the group identifier and not included in the exiting request, a subgroup to which the subgroup identifier corresponds being a subgroup of the target group and members of the subgroup constituting a subset of members of the target group;
   search a member list of the target group according to the group identifier;
   determine whether the client is a creator of the target group;
   if the client is the creator of the target group, dissolve the target group and the subgroup; and
   if the client is not the creator of the target group,
      delete the client from the member list of the target group,
      search a member list of the subgroup according to the subgroup identifier, and
      delete the client from the member list of the subgroup.

* * * * *